United States Patent [19]
Arnold et al.

[11] Patent Number: 5,343,507
[45] Date of Patent: Aug. 30, 1994

[54] SHUTDOWN COOLING SYSTEM FOR OPERATION DURING LAPSE OF POWER

[75] Inventors: Edward C. Arnold, Plum, Pa.; Milan M. Guina, Braine-L'Alleud, Belgium

[73] Assignee: Westinghouse Electric Corporation, Pittsburgh, Pa.

[21] Appl. No.: 129,827

[22] Filed: Sep. 30, 1993

[51] Int. Cl.⁵ .............................................. G21C 15/18
[52] U.S. Cl. .................... 376/298; 376/277; 376/203; 376/299
[58] Field of Search ............... 376/203, 277, 298, 299, 376/310

[56] References Cited

U.S. PATENT DOCUMENTS

| | | | |
|---|---|---|---|
| 3,859,166 | 1/1975 | Flynn et al. | 376/282 |
| 3,949,971 | 4/1976 | Gaffal et al. | 376/203 |
| 4,024,911 | 5/1977 | Forrest et al. | 376/203 |
| 4,113,561 | 9/1978 | Fidler et al. | 376/299 |
| 4,157,939 | 1/1979 | Schabert et al. | 376/282 |
| 4,510,118 | 4/1985 | Esayan et al. | 376/282 |
| 4,587,079 | 5/1986 | Fajeau et al. | 376/298 |
| 4,668,467 | 5/1987 | Miler et al. | 376/298 |
| 4,784,824 | 11/1988 | Gandrille et al. | 376/282 |
| 4,808,369 | 2/1989 | Yamanari et al. | 376/299 |
| 4,830,815 | 5/1989 | Gluntz | 376/298 |
| 4,844,857 | 7/1989 | Conrads | 376/298 |

Primary Examiner—Daniel D. Wasil

[57] ABSTRACT

A shutdown cooling system for a nuclear reactor operates during lapse of normal power and emergency power and has an independent power source fo removing residual heat while cooling the seals of the main reactor coolant pump. A high pressure pump delivers cooling water to the reactor cooling pump seals, a low pressure pump circulates core coolant, and a cooling mechanism discharges the decay heat. Electrical power for the pumps and associated valves and controls is provided by a dedicated power source apart from the regular residual heat removal apparatus of the reactor, and apart from the emergency generators provided for regular power failure backup.

16 Claims, 4 Drawing Sheets

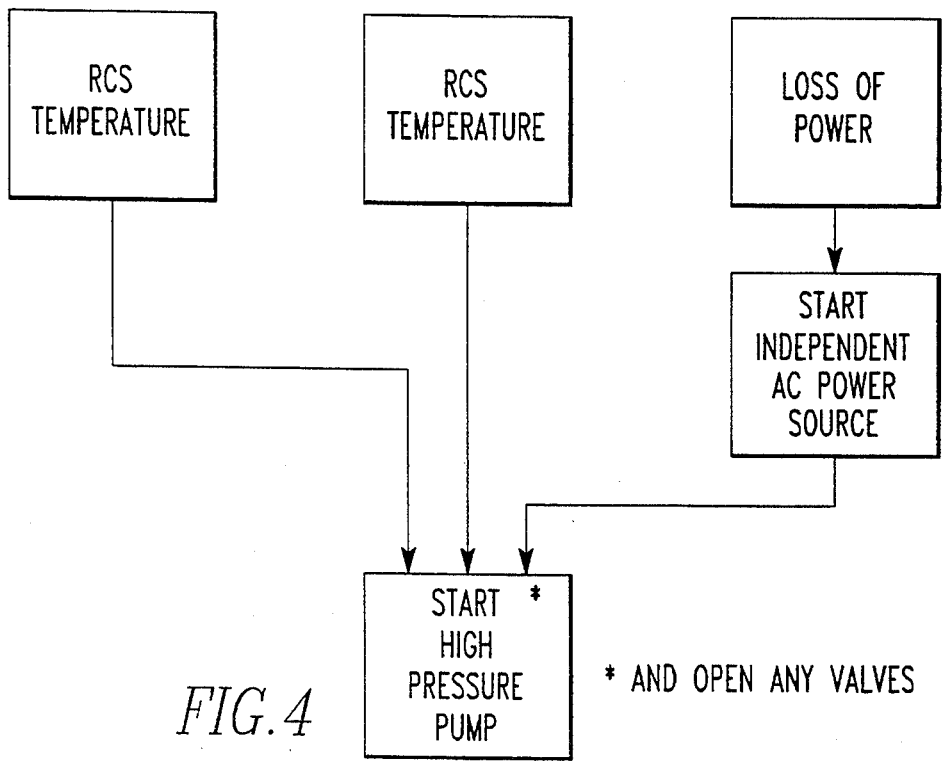
FIG.4  * AND OPEN ANY VALVES
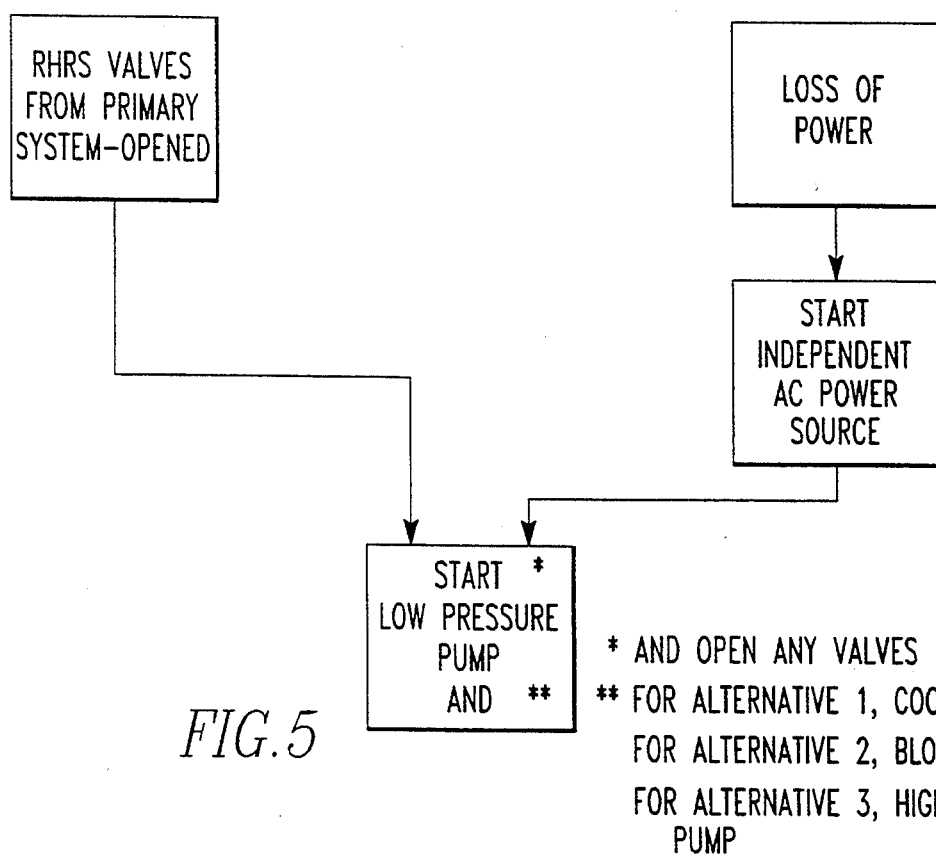
FIG.5
* AND OPEN ANY VALVES
** FOR ALTERNATIVE 1, COOLING PUMP
   FOR ALTERNATIVE 2, BLOWER
   FOR ALTERNATIVE 3, HIGH PRESSURE PUMP

SHUTDOWN COOLING SYSTEM FOR OPERATION DURING LAPSE OF POWER

BACKGROUND OF THE INVENTION

1. Field of the Invention

The invention relates to the field of cooling arrangements for nuclear reactors when in a shutdown mode. In particular, the invention provides a cooling system that is separately powered and operable independently of the residual heat removal system of the reactor, and is arranged to cool the seals of the primary reactor coolant pump(s) and the primary core coolant.

2. Prior Art

Pressurized water and boiling water nuclear reactors having a number of cooling systems operable during different phases of reactor operation to remove heat produced by nuclear fission in the reactor core. The primary operational function of the reactor is to heat a liquid coolant that is pumped through a primary coolant circuit having the reactor vessel in series with means for converting the heat energy in the coolant to motive energy, for example to operate an electrical generator. This primary operational function can be considered a cooling function, i.e., cooling the reactor core, as well as an energy transfer function.

In a pressurized water reactor, the primary coolant circuit includes a stream generator in series with the reactor, for producing stream in coolant water that is isolated from the primary coolant by a heat exchanger. The steam produced by the steam generator drives a turbine coupled to an electric generator. Thus the primary coolant circuit removes heat energy from the reactor core and moves it to the stream generator.

In a pressurized water reactor, the primary coolant circuit is operated at substantial pressure (e.g., 150 bar) such that the water does not boil at the substantial temperature to which the coolant is heated (e.g., 30° C.). One or more reactor coolant pumps circulates the coolant in the loop including the respective heating and heating-dissipating (energy extracting) elements. This coolant pump requires shaft sealing to maintain the pressure barrier, and the coolant pump seals can be cooled by a further flow of coolant (normally from a different source than the primary coolant circuit), to maintain the integrity of the seals.

A second cooling funtion is provided for safety reasons, to deal with the possibility of a loss of primary coolant circuit function during operation of the reactor. A breach in the primary coolant circuit, for example, could allow the core to overheat, resulting in damage to the nuclear fuel. A pressurizer arrangement injects additional coolant into the circuit to maintain operational pressure and to replace coolant that may be lost through a minor breach or leak in the coolant circuit. Various techniques are known for cooling the reactor core in the event of a major breach such as the rupture of a conduit in the primary coolant circuit. Neutron absorbing control rods can be inserted into the fuel array quickly to damp the nuclear reaction, for example when the sensed coolant pressure drops. However, it remains necessary to cool the operationally-heated fuel. A volume of emergency cooling water can be maintained, to be pumped or released by gravity into reactor vessel, such that the emergency cooling water can cool the core. Such an arrangement can involve circulating the emergency coolant, such as by condensing and recycling stream released from the coolant water when boiledby the hot core. Alternatively or in additiion, one or more heat exchangers can be used to move heat from the coolant to some external sink.

A third cooling function applies when the reactor is not operational but the nuclear fuel in the reactor vessel continues to generate heat due to nuclear decay. Residual heat removal arrangements, such as disclosed in U.S. Pat. No. 4,113,561-Fidler et al, provide additional conduits, pumps and heat exchangers for removing heat from the core when the reactor is not operating to generate electric power. Such systems may be coupled directly to the primary coolant circuit as in Fidler et al, or coupled through heat exchangers as in U.S. Pat. No. 4,830,815-Gluntz.

Arrangements for emergency cooling and those for residual heat removal are similar to one another and similar to operational power generation in that each is directed to moving heat energy away from the core. However, the source of the cooling water employed, the manner in which the particular cooling system is powered, the pressure at which the system must operate, the cooling capacity required in view of precisely how the reactor is cooled, the relative gravity of the situation, and other aspects are quite different.

Most nuclear power plants have several sources of electric power, including the power generated locally the turbine/generator, offsite power from the normal electric power grid, and emergency power generated by emergency diesel generators. Typically, two emergency diesel generators are provided such that one generator is available if the other should fail to operate. The emergency generators are "safety grade," and in design planning to prepare for potential accidents and similar contingencies, at least one of the emergency generators typically is assumed to be available for powering shutdown functions and emergency cooling in the event of a design basis accident during operation of the reactor. Similarly, at least one diesel generator is assumed to be available for powering residual heat removal functions when the reactor is not generating operational power, that is, during shutdown. As with many safety systems employed with nuclear reactors, the emergency generators are designed for high reliability and automatic actuation. The generators are physically separated from one another to reduce the likelihood that both will be damaged by a forseeable, if unlikely, accident. Nevertheless, the assumption that at least one emergency power source will always be available is questionable. During shutdown, power generated locally by the reactor is not available. It is not inconceivable that in the event of a major disruption, power from the power grid and both of the two emergency generators may be unavailable as well. (An actual occurrence of this situation is described in US NRC Document NUREG-1410).

If none of the respective power source is available, there are two primary concerns applicable durnig shutdown. If the reactor coolant system is hot and pressurized, a first concern is cooling the seals of the reactor coolant pumps to maintain the pressure barrier. With loss of cooling, the hot reactor coolant seals degrade from the effects of hot coolant, causing increased leakage of coolant and unintended depressurization. When the reactor core is in shutdown and depressurized, a further concern is removal of decay heat that is still being generated by the core. If all poer is lost and cooling functoins are disabled, the reactor coolant system will reheat, and could boil away the coolant, leaving the reactor core without any means to remove heat generated by the core.

Whereas existing nuclear power plant designs provide pump seal cooling and residual heat removal functions using the primary valves, pumps, heat exchangers and other service elements that operate when power is available, it would be advantageous to provide a cooling system that is not dependent on the design basis emergency backup diesel generators, and is useful during shutdown to maintain minimal cooling functions, including at least cooling of the reactor coolant pump seals, even when all other sources of power are lost.

SUMMARY OF THE INVENTION

It is an object of the invention to provide a shutdown system for maintaining critical cooling functions in the event of a loss of design basis electrical power.

It is also an object of the inventioin to remove normal decay ehat from a nuclear reactor for protecting the reactor pump selas, suing a dedicated automatically actuated cooling system driven from a power source that is independent of backup emergenc power sources.

It is a further object of the invention to provide independent reactor pump seal cooling using an auxiliary cooling water source and a dedicated cooling pump, coupled by automatic start logic to a dedicated power source that is independent of general backup power systems.

These and other objects are accomplished by a shutdown cooling system for operation during lapse of power. The system has a high pressure pump operable to deliver cooling water to the reactor coolant pump seals, a low pressure pump for core coolant circulation, and a cooling mechanism for decay heat removal. Power for the pumps and all necessary electrical equipment is provided by an independent dedicated power source, thereby providing decay heat removal and protection of the coolant pump seals regardless of operational status and emergency power availability from the backup emergency generators.

BRIEF DESCRIPTION OF THE DRAWINGS

There are shown in the drawings certain examples of the invention as presently preferred. It should be understood that the invention is not limited to the arrangements disclosed for purposes of illustration, and is capableo f variations within the scope of the invention claimed. In the drawings.

FIG. 4 is a flow chart illustrating automatic activation of the high pressure pump of a preferred cooling system according to the invention, upon sensing a loss of power during particular coolant and pressure conditions.

FIG. 5 is a flow chart illustrating actuation of the lower pressure group.

DETAILED DESCRIPTION OF THE PREFERRED EMBODIMENTS

Figure 1:
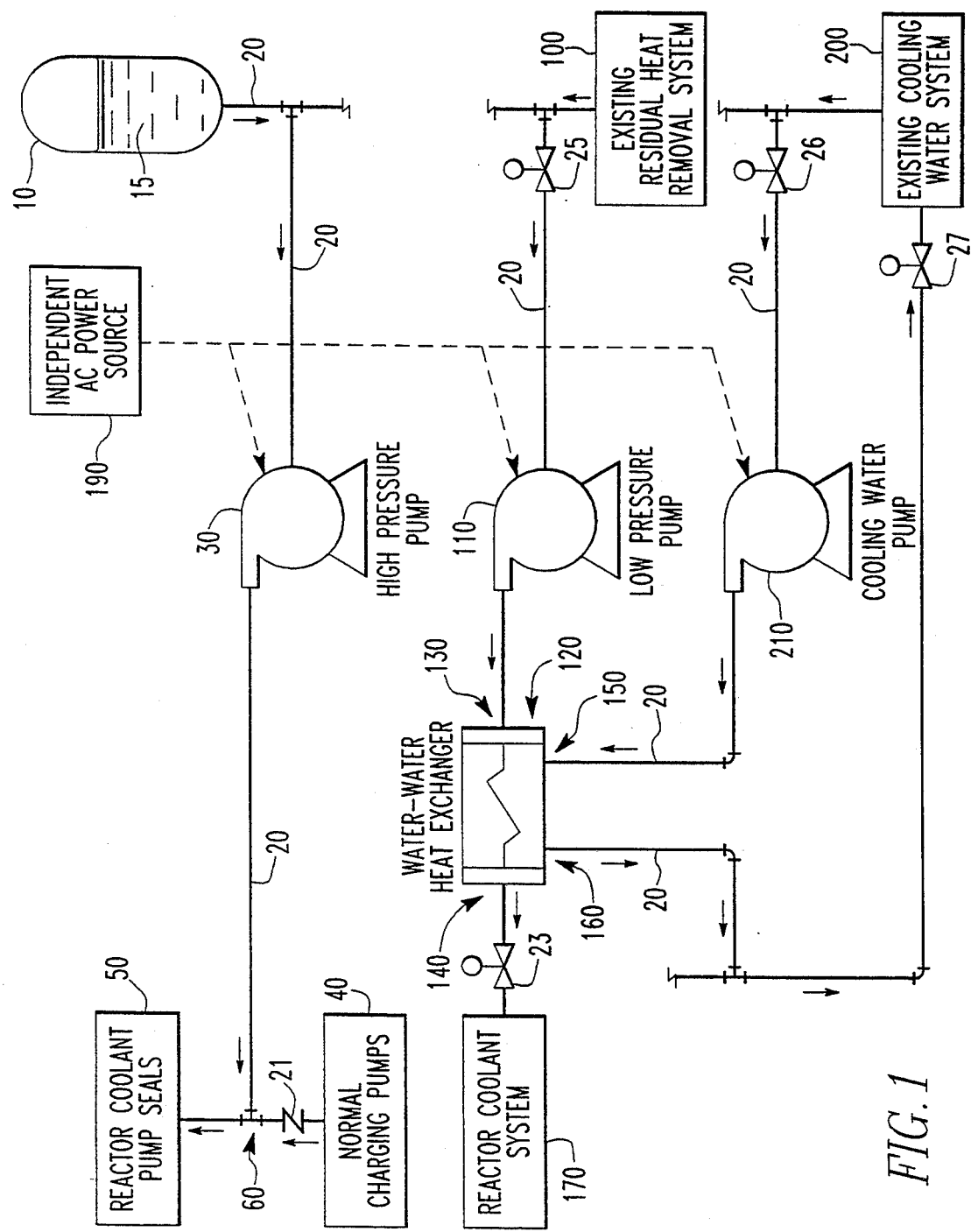
FIG. 1 is a schematic illustration showing the shutdown cooling system for operation during lapse of power, according to a first embodiment of the invention.

FIG. 1 schematically shows a shutdown coolign system for operation lapse of power, according to a first embodiment of the invention. Coolant tank 10, being filled with a supply of coolant such as water 15, is coupled in fluid communication with a high pressure pump 30. A plurality of fluid conduits 20 provide a means for fluid communication between the coolant tank 10 and high pressure pump 30. The high pressure pumo 30 is coupled via conduits 20 and junction 60 with the reactor coolant pump (RCP) seals 50.

The preferred coolant is water although other fluids can be used. Gases such as air, carbon dioxide, helium and dry steam have been used successfully as coolants in nuclear reactors. Liquids such as water, single-phase pressurized water, two phase boiling water or fog, heavy water, terphenyl, hydrogenated terphenyl, molten bismuth and molten salts such as fluorides have also been successfully used as coolants.

Under normal operating conditions junction 60 is arranged, either manually or automatically, such that water circulated by the normal charging pumps 40 is directed through conduits in heat transfer contact with the RCP seals 50. The water directed to the RCP seals is recirculated back to the normal charging pumps 40 and is thereby re-used. If a power failure occurs (i.e., the power generated locally by the turbine/generator, off-site power from the normal electric power grid, and emergency power generated by emergency diesel generators are all lost) the normal charging pump 40 will not be powered and consequently will not function. Therefore under power fail conditions junction 60 is arranged, preferably automatically but also possibly including manual actions, to direct wate from the high pressure pump 30 to the RCP seals 50. Water is suppied from the coolant tank 10, pumped by the high pressure pump 30, through conduits 20, through junction 60, to the RCP seals 50, thereby cooling the RCP seals 50. Valve 21 prevents misdirection of the flow.

A low pressure pump 110 is coupled to the existing residual heat removal system (RHRS) 100 and a heat exchanger 120 via conduits 20. Heat exchanger 120 is a water-to-water heat exchanger, and has a primary fluid circuit with an inlet and outlet and a secondary fluid circuit with an inlet and outlet. The heat exchanger is operable to transfer heat from the water flowing through the primary circuit to the water flowing though the secondary circuit.

The low pressure pump is coupled to the primary inlet 130 of the heat exchanger 120. The existing reactor coolant system (RCS) 170 is coupled to the primary outlet 140. Water from the RHRS 100, being pumped by the low pressure pump 110, flows into the primary inlet 130, through the primary circuit, out of the primary outlet 140, and into the RCS 170. Water flowing through the RCS is recirculated back to the RHRS 100and is thereby re-used. Valves 23 and 25 provide isolation from the RHRS 100 during normal operation, and open to allow flow via the low pressure pump 110.

A cooling water pump 210 is coupled to the existing cooling water system (CWS) 200 and the secondary circuit of heat exchanger 120 via conduits 20. Water from the CWS 200, being pumped by the cooling water pump 210, flows into the secondary inlet 150, through the secondary circuit, out of the secondary outlet 160 and back to the CWS 200. The heat from water in the primary circuit is transferred to the water in the secondary circuit, thereby cooling the water in the primary circuit. Valves 26 and 27 provide isolation from the CWS 200 during normal operation, and open to allow flow via the cooling water pump 210.

An independent power source 190, as shown in FIG. 1, is coupled to the high pressure pump 30, low pressure pump 110, and cooling water pump 210, thereby providing power during a power failure. Power from the independent power source 190 may also be routed to other systems where needed, for example power may be needed to automatically re-arrange junction 60 such that water can be directed from the coolant storage tank via the high pressure pump to the RCP seals. Similarly other junctions where the invention is coupled into the existing systems may need to be rearranged to route water to the proper conduits and therefore may also require power from the independent power source. These junctions preferably are arranged with controllable valve (e.g., valves 23, 25, 26, 27) operated by a suitable control system that triggers reconfiguration of the respective flowpaths upon detection of the loss of regular ad emergency power.

Figure 2:
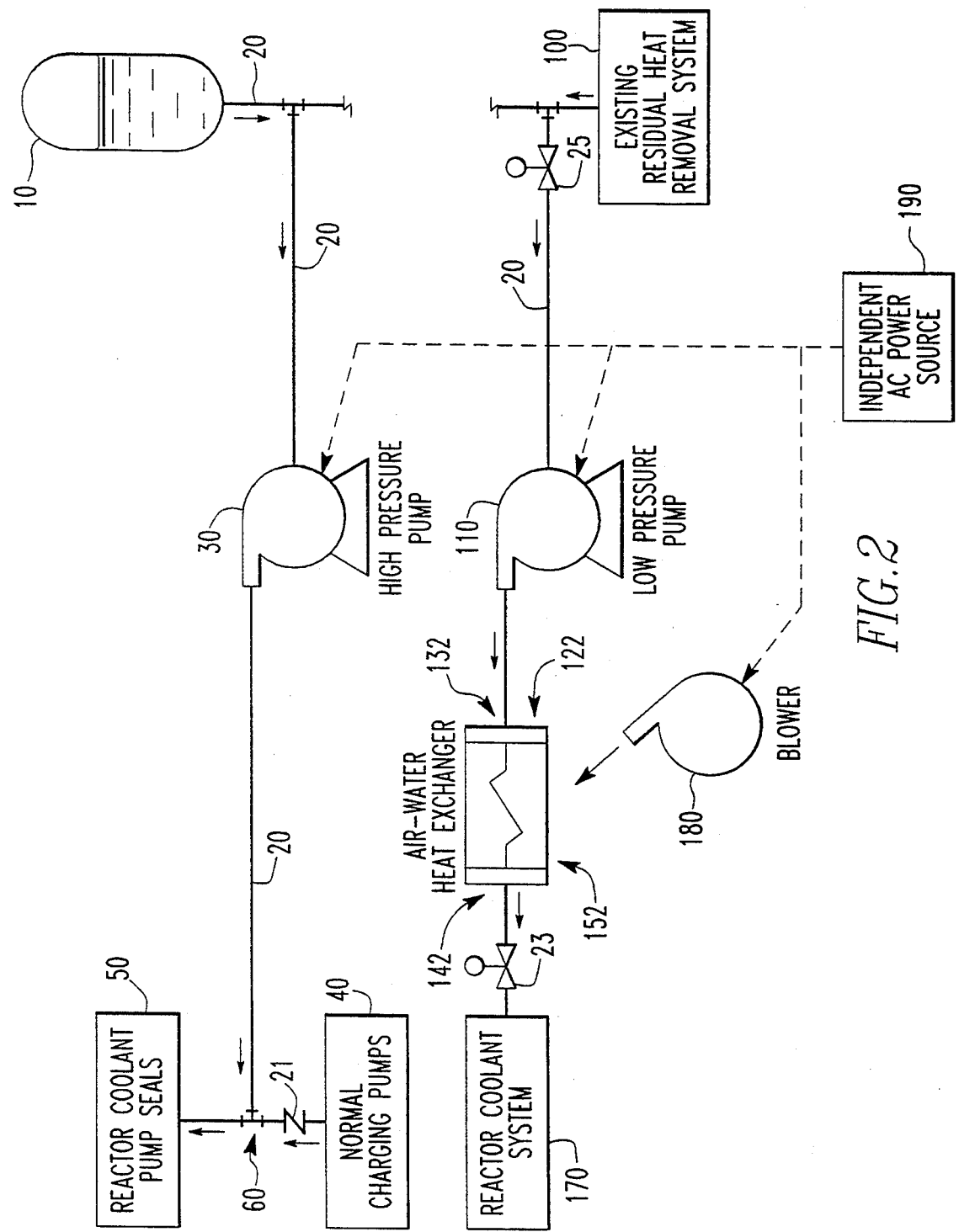
FIG. 2 is a schematic illustration corresponding to FIG. 1 and showing an alternative embodiment including an air/water heat exchanger.

FIG. 2 shows a second embodiment of the invention having an alternate configuration for residual heat removal, the same reference numbers being used to identify elements that correspond to those of the first embodiment. Cooling water is supplied to the RCP seals in the same fashion as the first embodiment. The high pressure pump 30 circulates water from coolant tank 10 to RCP seals 50 via conduits 20. Valve 21 prevents misdirection of flow. A low presusre pump 110 is coupled to the existing residual eat removal system (RHRS) 100 and a heat exchanger 122 via conduits 20. In this embodiment, the heat exchanger 122 is an air-to-water type, and has a primary fluid circuit with an inlet and outlet and a secondary circuit that is air cooled. The heat exchanger is operable to transfer heat from water flowing through the primary circuit to the air flowing though the secondary circuit.

The low pressure pump 110 is coupled to the primary inlet 132 of the heat exchanger 122. Teh existing reactor coolant system (RCS) 170 is coupled to the primary outlet 142 of the heat exchanger 122. Water from the RHRS 100, being pumped by the low pressure pump 110, flows into the primary inlet 132, through the primary circuit, out of the primary outlet 142, and into the RCS 170. Water flowing through the RCS is recirculated back to the RHRS 100 and is thereby re-used. Valves 23 and 25 provide isolation from the RHRS 100 during normal operation, and open to allow flow via the low pressure pump 110.

Blower 180 is operable to provide a stream of forced air, flowing over the air cooled secondary circuit 152 of the heat exchanger. The heat from water in the primary circuit is transferred to the air flowing over the air cooled secondary circuit, thereby cooling the water in the primary circuit. An independent power source 190, as shown in FIG. 2 is coupled to the high pressure pump 30, low pressure pump 110, blower 180, and valves (e.g., 23 and 25) as needed, thereby providing power during a power fail condition.

Figure 3:
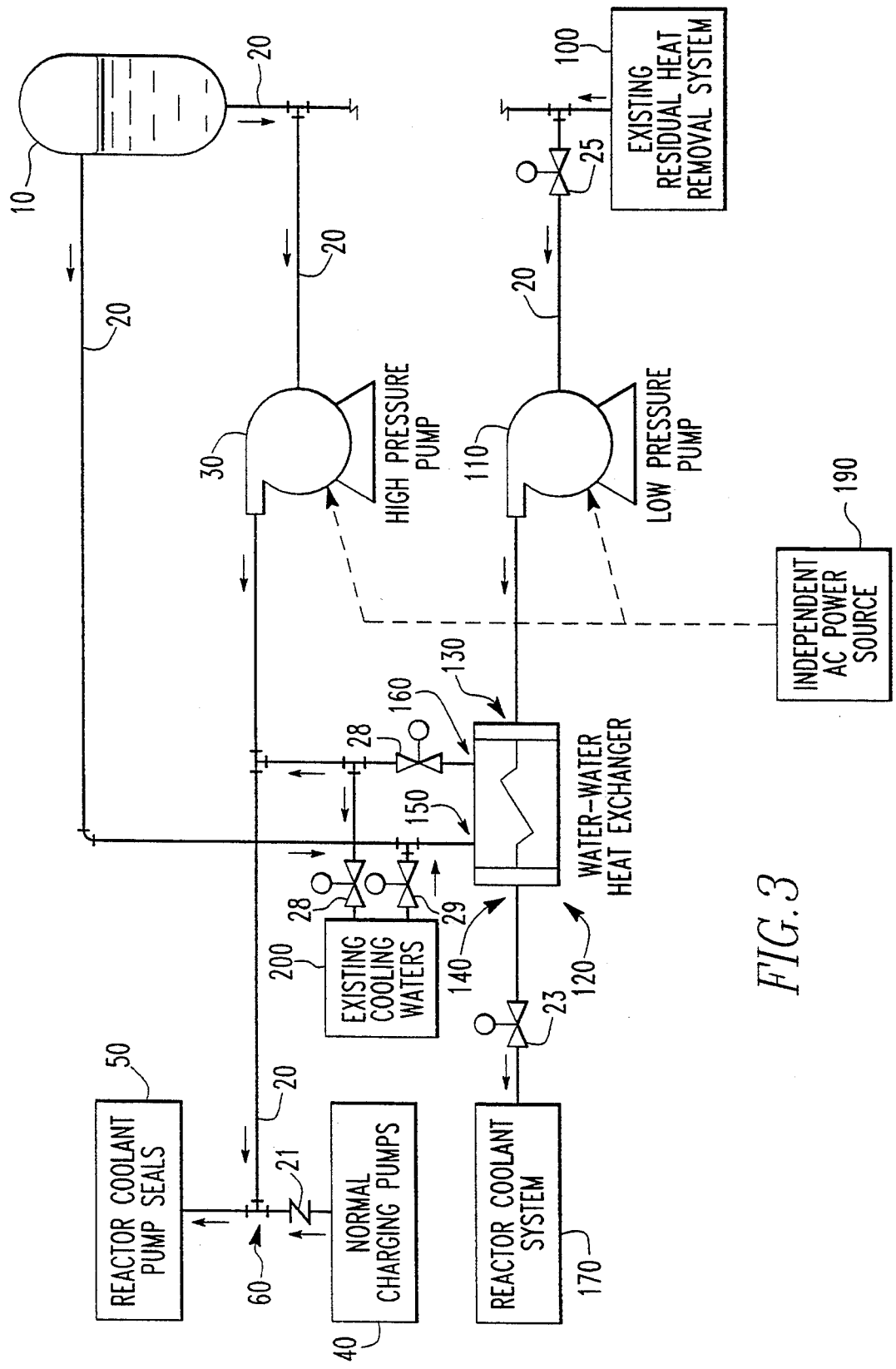
FIG. 3 is a schematic illustration of a further alternative that additionally includes use of the high pressure pump for cooling of recirculated reactor coolant.

FIG. 3 shows a third embodiment of the invention, having an alternate configuration for residual heat removal, the same reference numbers again being used. Cooling water is supplied to the RCP seals in the same fasion as the first and second embodiment. The high pressure pump 30 circuits water form coolant tank 10 to RCP seals 50 via conduits 20. Valve 21 prevents flow misdirection. Low pressure pump 110 is coupled to the existing residual heat removal system (RHRS) as shown in the first and second embodiment. The heat exchanger 120 can be a water-to-water type, and has a primary fluid circuit with an inlet and outlet and a secondary fluid circuit with an inlet and outlet. The heat exchanger is operable to transfer heat from water flowing through the primary circuit to water flowing though the secondary circuit.

The low pressue pump is coupled to the primary inlet 130 of the heat exchanger 120. The existing reactor coolant system (RCS) 170 is coupled to the primary outlet 140 of the heat exchanger 120. Water from the RHRS 100, being pumped by the low pressure pump 110, flows into the primary inlet 130, through the primary circuit, out of the porimary outlet 140, and into the RCS 170. Water flowing through the RCS is recirculated back to the RHRS 100 and is re-used. Valves 23 and 25 provide isolation from the RHRS 100 during normal operation, and open to allow flow via the low pressure pump 110.

Colling water from the coolant tank 10 is circulated though the heat exchanger secondary circuit by the high pressure pump 30 via conduits 20. Water from the coolant tank 10, being pumped by the high pressure pump 30, flows into the secondary inlet 150, through the secondary circuit, out of the secondary outlet 160 and back to the CWS 200. Valve 28 and 29 isolate this high pressure cooling from the normal system. The heat from water in the primary circuit is transferred to the water in the secondary circuit, thereby cooling the water in the primary circuit. An independent power source 190, as shown in FIG. 1 is coupled to the high pressure pump 30, low pressure pump 110 and valves (e.g., 23, 25, 28, 29) as needed, thereby providing power during a power fail condition.

FIG. 4 shows a flow chart illustrating automatic activation of the high pressure pump of a preferred cooling system according to the invention, upon sensing a loss of power during particular coolant temperature and pressure conditions. The high pressure pump is automatically activated depending on temperature or pressure conditions in the reactor coolant system (RCS). If the RCS temperature rises above a pre-determined level, such as 320° C., or the RCS pressure drops below a predetermined level, such as 130 bar, the high pressure pump is activated automatically. Additionally if all other sources of power are lost, the independent power source and the high pressure pump are activated.

Upon starting the high pressure pump, it is also necessary to open the proper valves such that cooling water circulated by the high pressure pump is directed to the RCP Seals. Under normal conditions the normal charging pumps circulate cooling water to the RCP seals, and the high pressure pump is inactive. However if the RCS temperature or pressure deviates from the normal operating conditions, and the high pressure pump is automatically activated, controllable valves at the respective junctions are automatically opened, in known manner. Teh valves route the flow of cooling water to the RCP seals as shown. Appropriate redundant valves or conduits and check valves can be provided, to ensure operation in an emergency situation while having no effect on normal reactor operation.

If there is a power fail condition, the independent powre source is actuated. The independent power source may provide either AC or DC power of both.

The high pressure pump and the automatic valves are powered by the independent power source. The high pressure pump are automatically activated and the various valves automatically opened, to properly route the flow of cooling water to the RCP seals under power fail conditions.

FIG. 5 shows a flow chart illustrating actuation of the low pressure pump. The low pressure pump is automatically activated upon detection of either a power fail condition or valves fom the RHRS being opened. Under normal conditins, various pumps and heat transfer means of the RHRS transfer residual heat away from the reactor core. If a power fail condition occurs, the independent power source and the low pressure pump are activated, the low pressure pump being powered from the independent power source. In the first embodiment of the invention as shown in FIG. 1, the low pressure and cooling water pumps are activated, both pumps being powered from the independent power source. The respective valves are automatically opened such that water is circulated though the primary circuit of the heat exchanger by the low pressure pump and water is circulated though the secondary circuit of the heat exchanger by the cooling water pump.

In the second embodiment of the invention as shown in FIG. 2, the low pressure pump and blower are activated, the blower and pump being powered from the independent power source. The respective valves are automatically opened such that water is circulated though the primary circuit of the heat exchanger by the low pressure pump, the secondary circuit of the heat exchanger being cooled by air flow generated by the blower.

In the third embodiment of the invention as shown in FIG. 3, the low pressure pump and respective valves are automatically actuated such that water is circulated though the primary circuit of the heat exchanger by the low pressure pump and water is circulated though the secondary circuit of the heat exchanger by the high pressure pump.

It may be desirable in certain situations to activate the low pressure pumps in non-power-fail conditions. In that case, the system can be operable to detect when the RHRS primary valves are opened and automatically to start the low pressure cooling pumps.

The invention having been disclosed in connection with the foregoing variations and examples, additional variations will now be apparent to persons skilled in art. The invention is not intented to be limited to the variations specifically mentioned, and accordingly reference should be made to the appended claims rather than the foregoing discussion of preferred examples, to assess the scope of the invention in which exclusive rights are claimed.

We claim:

1. An integrated emergency shutdown power and cooling system for maintaining cooling functions in a nuclear reactor during power failure conditions, the reactor having residual heat removal means normally operated during shutdown, the system comprising:
   a first pump in fluid communication with a reactor coolant pump seal, the first pump being operable to pump coolant to the reactor coolant pump seal;
   a coolant storage tank containing coolant and being in fluid communication with the first pump such that coolant is pumped form the storage tank to the reactor coolant pump seal, thereby cooling the reactor coolant pump seal;
   a second pump in fluid communication with a residual heat removal system, the second pump being operable to pump coolant from the residual heat removal system;
   a heat transfer means in fluid communication with the second pump and an existing reactor coolant system such that coolant circulated by the second pump is cooled by the heat transfer means before being circulated to the existing reactor coolant system;
   an independent power source coupled to the first pump and the second pump such that power is supplied from the independent power source to the first pump and the second pump when other sources of power are lost;
   whereby during a power fail condition disabling the residual heat removal means normally operated during shutdown, the first pump, in combination with the coolant in the coolant storage tank, pumps coolant to the reactor coolant pump seal when the reactor is hot and pressurized and the second pump, in combination with the heat transfer means, pumps coolant to the heat transfer means, thereby reducing the temperature of teh coolant when the reactor core is shut down.

2. The system of claim 1, wherein the coolant comprises water.

3. The system of claim 1, wherein the first pump is a high pressure pump.

4. The system of claim 1, wherein the second pump is a low pressure pump.

5. The system of claim 2, wherein heat transfer means comprises a water to water heat exchanger and a cooling water pump in fluid communication with a supply of cooling water, the cooling water pump being powered by the independent power source, the heat exchanger having a primary circuit and a secondary circuit, the primary circuit being in fluid communication wih the second pump and the existing reactor coolant system, the secondary circuit being in fluid communication with the cooling water pump and an existing cooling water supply system, the heat exchanger being operable to transfer heat from the primary circuit to cooling water in the secondary circuit, thereby reducing the temperature of the primary circuit.

6. The system of claim 2, wherein the heat transfer means comprises an air to water heta exchanger and a blower, the heat exchanger having a primary circuit in fluid connection with the second pump and the existing reactor coolant system, and a secondary circuit cooled by air flow, the air flow being generated by the blower, the blower being powered by the independent power source, the heat exchanger being operable to transfer heat from the primary circuit to the air flow over the secondary circuit, thereby reducing the temperature of the primary circuit.

7. The system of claim 2, wherein heat transfer means comprises a water to water heat exchanger, the heat exchanger having a primary circuit and a secondary circuit, the primary circuit being in fluid communication with the second pump and the existing reactor coolant system, the secondary circuit being in fluid communication with the coolant storage tank and the first pump, the heat exchanger being operable to transfer heat from the primary circuit to the secondary circuit, thereby reducing the temperature of the primary circuit.

8. An integrated emergency shutdown power and cooling system for maintaining cooling functions in a nuclear reactor during power failure conditions, comprising:

a high pressure pump in fluid communication with a reactor coolant pump seal, the high pressure pump being operable to pump water to the reactor coolant pump seal;

a water storage tank containing water and being in fluid communication with the high pressure pump such that water is pumped from the tank to the reactor coolant pump seal, thereby cooling the reactor coolant pump seal;

a low pressure pump in fluid communication with a residual heat removal system, the low pressure pump being operable to pump water from the residual heat removal system;

a cooling water pump in fluid communication with the existing cooling water system, the cooling water pump being operable to pump water from the existing cooling water system;

a water to water heat exchanger having a primary circuit and a secondary circuit, the primary circuit being in fluid communication with the low pressure pump and an existing reactor coolant system, the low pressure pump being operable to pump water from the residual heat removal system through the primary circuit to the reactor coolant system, the secondary circuit being in fluid communication with the cooling water pump and the existing cooling water system, the cooling water pump being operable to pump waer from the existing cooling water system though the secondary circuit such that heat from water circulated though the primary circuit is transferred to the water circulated though the secondary circuit, thereby reducing the temperature of the cooling water circulated through the primary circuit;

an independent power source controllably coupleable to the high pressure pump and the low pressure pump such that power is supplied from the independent power source to the high pressure pump and the low pressure pump when regular and emergency power are lost, the independent power source, high pressure pump and low pressure pump being provided in addition to cooling means operative from said regular and emergency power;

whereby during a power fail condition the high pressure pump, in combination with the water in the water storage tank, cools the reactor coolant pump seal when the reactor is hot and pressurized, and the low pressure pump, in combination with with the heat exchanger, cools the reactor coolant system when the reactor is shut down.

9. An integrated emergency shutdown power and cooling system for maintaining cooling functions in a nuclear reactor during power failure conditions, comprising:

a high pressure pump in fluid communication with a reactor coolant pump seal, the high pressure pump being operable to pump water to the reactor coolant pump seal;

a water storage tank containing water, in fluid communication with the high pressure pump such that water is pumped from the tank to the reactor coolant pump seal, for cooling the reactor coolant pump seal;

a low presure pump in fluid communication with a residual heat removal system, the low pressure pump being operable to pump water from the residual heat removal system;

a cooling water pump in fluid communication with an existing cooling water system, the cooling water pump being operable to pump water from the existing cooling water system;

a air to water heat exchanger having a primary circuit and a secondary circuit, the primary circuit being in fluid communication with the low pressure pump and an existing reactor coolant system, the low pressure pump being operable to pump water from the residual heat removal system through the primary circuit to the reactor coolant system, the secondary circuit being air cooled by a blower, the blower being operable to blow air though the secondary circuit, the heat exchanger being operable to transfer heat from the primary circuit to the air blown though the secondary circuit, thereby reducing the temperature of the primary circuit;

an independent power source coupled to the high pressure pump and the low pressure pump such that power is supplied from the independent power source to the high pressure pump and the low pressure pump when regular and emergency power are lost, the independent power source, high pressure pump and low pressure pump being provided in addition to cooling means operative from said regular and emergency power;

whereby during a power fail condition the high pressure pump, in combination with the water in the water storage tank, cools the reactor coolant pump seal when the reactor is hot and pressurized, and the low pressure pump, in combination with the heat exchanger, cools the reactor coolant system when the reactor is shut down.

10. An integrated emergency shutdown power and cooling system for maintaining cooling functions in a nuclear reactor during power failure conditions, comprising:

a high pressure pump in fluid communication with a reactor coolant pump seal, the high pressure pump being operable to pump water to the reactor coolant pump seal;

a water storage tank containing water, in fluid communication with the high pressure pump such that water is pumped from the water tank to the reactor coolant pump seal, thereby cooling the reactor coolant pump seal;

a low pressure pump in fluid communication with a residual heat removal system, the low pressure pump being operable to pump water from the residual heat removal system;

a cooling water pump in fluid communication with the existing cooling water system, the cooling water pump being operable to pump water from the existing cooling water system;

a water to water heat exchanger having a primary circuit and a secondary circuit, the primary circuit being in fluid communication with the low pressure pump and an existing reactor coolant system, the low pressure pump being operable to pump water from the residual heat removal system through the primary circuit to the reactor coolant system, the secondary circuit being in fluid communication with the water storage tank and the high pressure pump, the high pressure pump being operable to pump water from the water storage tank though the secondary circuit such that heat from water circulated though the primary circuit is transferred to the water circulated though the secondary circuit thereby reducing the temperature of the cooling water circulated through the primary circuit;

an independent power source coupled to the high pressure pump and the low pressure pump such that power is supplied from the independent power source to the high pressure pump and the low pressure pump when regular and emergency power are lost, the independent power source, high pressure pump and low pressure pump being provided in addition to cooling means operative from said regular and emergency power;

whereby during a power fail condition the high pressure pump, in combination with the water in the water storage tank, cools the reactor coolant pump seal when the reactor is hot and pressurized, and the low pressure pump, in combination with the heat exchanger, cools the reactor coolant system when the reactor is shut down.

11. A method of cooling a nuclear power plant in power fail conditions comprising:

delivering a coolant from a coolant to a reactor coolant pump seal, at least during a pressurized state of the power plant, thereby cooling the reactor cooling pump seal;

circulating a coolant through a residual heat removal system, at least during a depressurized state of the power plant, said delivering and said circulating including pumping the coolant via powered means;

coupling to the powered means an independent backup power supply upon loss of power;

transferring the heat away from at least one of the coolant circulating through the residual heat removal system and the coolant pump seal;

wherein delivering the coolant to the reactor coolant pump seal and circulating the coolant through the residual heat removal system are carried out under said loss of power.

12. The method of claim 11, wherein said delivering a coolant is done using a high pressure pumping apparatus.

13. The method of claim 12, wherein said circulating a coolant is done using a low pressure pumping apparatus.

14. The method of claim 13, wherein said delivering a coolant from a coolant source is done by pumping coolant from a coolant storage receptacle.

15. The method of claim 14, wherein said transferring the heat away from the coolant is done using a water to water heat exchanger apparatus.

16. The method of claim 14, wherein said transferring the heat the away from the coolant is done using an air to water heat exchanger apparatus.

* * * * *